United States Patent [19]

Barrall et al.

[11] Patent Number: 4,792,359

[45] Date of Patent: Dec. 20, 1988

[54] DURABLE PHOSPHATE CERAMIC STRUCTURES AND THEIR PREPARATION

[75] Inventors: Jeffery L. Barrall; Robert C. Garman, both of Lancaster, Pa.

[73] Assignee: Armstrong World Industries, Inc., Lancaster, Pa.

[21] Appl. No.: 120,049

[22] Filed: Nov. 13, 1987

[51] Int. Cl.$^4$ .................... C04B 9/06; C04B 9/11; C04B 12/02; C04B 28/34
[52] U.S. Cl. .................... 106/85; 106/121; 501/111; 501/95; 264/333
[58] Field of Search ............... 106/85, 121; 501/111, 501/95; 264/333

[56] References Cited

U.S. PATENT DOCUMENTS

| | | | |
|---|---|---|---|
| 4,375,516 | 3/1983 | Barrall | 501/111 |
| 4,569,878 | 2/1986 | Barrall et al. | 428/704 |
| 4,592,966 | 6/1986 | Prior et al. | 428/704 |
| 4,604,318 | 8/1986 | Prior et al. | 501/111 |

*Primary Examiner*—William R. Dixon, Jr.
*Assistant Examiner*—David M. Brunsman

[57] ABSTRACT

Processes are described for producing strong, durable fiberous phosphate ceramic structures. Stronger fiberous phosphate ceramic structures can be produced by applying higher pressures during the reaction of phosphoric acid, a metal oxide selected from the group consisting of zinc oxide, calcium oxide, magnesium oxide, and aluminum oxide; and calcium silicate within a matrix of the fiber, or the fiber and a binder.

33 Claims, No Drawings

DURABLE PHOSPHATE CERAMIC STRUCTURES AND THEIR PREPARATION

BACKGROUND OF THE INVENTION

1. Field of the Invention

The present invention relates to phosphate ceramic articles and structures which are useful for partitions, wall decorations, walls, interior surfaces of buildings, aircraft, automobiles, and the like.

These compositions can also be bonded to paper, ceramic, metallic surfaces or the like for a particular use.

2. The Prior Art

A number of references can be found in the prior art which describe ceramic materials, laminated composites and processes for their preparation.

U.S. Pat. No. 4,569,878, for example, describes laminated composites prepared from the reaction of a metal oxide, calcium silicate and phosphoric acid. These composites are characterized in that they have superior fire resistant properties. The laminated structures described in this reference comprise contiguous layers of a selected structural layer material with intervening layers of the bonding composition used which comprised a metal oxide calcium silicate and the phosphoric acid.

The same reactants are also disclosed and applied in U.S. Pat. No. 4,375,516. This reference relates to the preparation of rigid, water resistant phosphate ceramic materials and processes for either foamed or non-foamed materials.

The instant invention relates to a system also having calcium silicate, a metal oxide, and phosphoric acid as the reactants. The instant invention, however, provides ceramic articles which have superior strength and durability. Storage, transportation, and shipping advantages are also obtained by using materials of the instant invention. These materials are flexible, light, and easily stored or packaged before the phosphoric acid solution is applied to provide the rigid ceramic. In another embodiment the phosphoric acid is contained in microcapsules within the homogeneous mixture containing wollastonite and metal oxide. These compositions are also easily shipped since they are more flexible. At a later date, the rigid article can be formed. These and other advantages of the instant process and materials will be appreciated as this description proceeds.

SUMMARY OF THE INVENTION

Phosphate ceramic articles can be prepared by a method which gives the ceramic products superior strength and durability. In this method, a phosphoric acid solution is applied to a phosphate reactive substrate composition which comprises: calcium silicate (wollastonite) with a matrix of fiber, or fiber and binder. Since a metal oxide is required for the reaction, a metal oxide selected from calcium oxide, aluminum oxide, zinc oxide, and magnesium oxide is present: (1) in the solution, (thus forming a metal phosphate salt complex in the solution), (2) dispersed throughout the substrate along with the wollastonite, or (3) both in the solution and dispersed throughout the substrate. Pressure is then applied in an amount effective to compact the substrate as the reaction forms the phosphate ceramic. The application of pressure in this step can, if desired, be used to drive the solution into the substrate, completely wetting the substrate. Such pressure can also be used to wring excess solution from the substrate.

Pressure must be maintained during the reaction of the calcium silicate with the phosphoric acid or the metal oxide-phosphate complex until after the reacting material has set to form a rigid phosphoric ceramic. The pressure can then be released and the finished ceramic article removed for use.

The application of pressure provides a stronger, more dense, and more durable product. Furthermore, when the articles produced by the aboveindicated process must be stronger and withstand greater stress during use, the pressure can be increased to obtain an even stronger product. Suitably, the pressure can also be used to mold the substrate during the reaction and give desired shape to the finished ceramic article.

It can be noted that the term "solution" is used broadly herein to include aqueous reaction mixtures with phosphoric acid and desired amounts of the other dry reactants. Such solutions can be referred to as slurries when the amount of dry reactant added is not completely dissolved. This will readily occur in the preferred embodiments where some calcium silicate is also mixed in the solution to produce a coated ceramic article. The slurry-like nature will not interfere with the production of the phosphate ceramic although it is easier to wet the substrate with less viscous solutions and slurries. If it is found that a solution is too viscous for the particular substrate, an effective amount of water can be added.

This process is specifically intended for the phosphate reactive compositions described herein which contain a matrix. The term "matrix" is used herein to refer to the portion of the substrate which is non-reactive to the phosphate, and includes fiber and permissively a binder. The matrix makes the substrate compressable, providing needed body and bulk. The matrix holds the substrate together under the pressure applied during the reaction and provides a structure which, as the reaction takes place, will combine with the reaction product to give the finished article.

The matrix, along with other non-reactive ingredients, can also be used in specific embodiments to provide specific structures, configurations, designs, optical effects, and even to provide desired physical characteristics such as tensile strength or shock resistance. Additionally, in many applications, a pigment or the filler is also selected to provide specific characteristics.

Sometimes the fiber, is used in a chopped form so that a more homogeneous mixture can be formed with the phosphate reactive calcium silicate and metal oxide. The fiber, however, can also be a non-woven mass with the phosphate reactants dispersed within it. Even when the matrix includes binder, some amount of fiber is needed, and is especially needed if a high strength article is desired. The fiber of the matrix gives added strength and provides an internal structure to knit with the ceramic material as it forms. Importantly, the presence of fiber also allows the substrate to be compressable with the application of pressure. The presence of fiber acts to keep the wet, reacting ceramic material together so that it does not squeeze or flow out as pressure is applied. An effective amount of fiber, therefore, provides compressability, an interior matrix structure, and serves to hold the substrate together at the pressure level which is applied, if this is needed with the apparatus used.

Before the reaction, the substrate itself is a non-rigid composition which could be stored in bulk or in a container of a convenient size and shape. The substrate itself is more easily shipped and transported than the non-flexible, rigid product. The phosphoric acid solution can be applied after shipment at the destination followed by the application of pressure during the reaction to obtain the rigid ceramic product.

In another preferred embodiment, a solution of the phosphoric acid or the phosphoric acid and the phosphate metal salt is in microcapsules and is included within the substrate prior to the reaction. The microcapsules can be used in any desired amount. If desired, the microcapsules can be used in an amount which can reduce or eliminate the need for the application of a separate amount of solution. Either heat or the applied pressure could be used to rupture the capsules at a specific time and in this manner apply the solution to the substrate. For this embodiment pressure also insures a complete wetting of the whole substrate. In accordance with the instant method, pressure is maintained during the reaction until the rigid phosphate ceramic product is formed.

DETAILED DESCRIPTION

The reaction which is used in the instant process to provide the ceramic in the instant articles, requires calcium silicate; at least one metal oxide selected from the group consisting of: aluminum oxide, magnesium oxide, calcium oxide, and zinc oxide; and a phosphoric acid solution.

Each substrate must contain an amount of calcium silicate which will be effective to produce the amount of ceramic material needed in a useful article. While the amount required in any case will largely depend on the intended use, the application of pressure and use of the fiberous matrix (with or without binder and other desired materials) can permit useful ceramic matrix materials to be produced using smaller amounts of calcium silicate. Useful materials can also be obtained which could not be obtained without the presence of the matrix.

The amount of calcium silicate can, therefore, vary widely depending upon factors such as the intended application and the types of other ingredients. Calcium silicate could be as low as about 8% by weight of the substrate material. A suitable range for the amount of calcium silicate in the substrate can be from about 10 to about 96% by weight of the dry substrate. Preferred and more preferred amounts range from about 15 to about 85% by weight and from about 35 to about 75% by weight of the dry substrate. The amount of the metal oxide required for the reaction can also be incorporated either in the solution, in the substrate, or both. When it is present in the substrate, it should be homogeneously mixed with the wollastonite.

Fibers provide internal strength to the substrate, permitting the substrate to be subjected to high pressures during curing. Moreover, the fibers of the matrix perform several functions, serving also to make the reactive substrate compressable. Thus, with the use of pressure during curing, the substrate is compressed to give a more dense, and stronger ceramic product than would be possible without the use of fibers. Fibers also give the substrate internal strength. This can not only help the handling properties of the substrate, but it also helps to prevent the reacting composition of the substrate from flowing out of the press, which is more likely to occur if the matrix did not include fiber.

Not less than about 4% by weight of fiber (or more) is used. When small amounts of fiber are used, it may be preferred to select light weight fiber having relatively high aspect ratios or to include a small amount of binder in the matrix. An acceptable average aspect ratio can acceptably be in the range of from about 10 to about 25,000 and a preferred range is from about 10 to about 10,000.

The fiber can acceptably be present in an amount of from about 4 to about 90% by weight. Preferably, the fiber can be present in an amount of from about 10 to about 75% by weight. The amount of fiber selected in a specific instance will also be influenced by the intended use and the manner of preparation of the substrate. For example, in a wet-laid substrate, from about 14 to about 70% by weight fiber is preferred, but, if a dry-laid substrate is to be used to provide a ceramic article, a minimum 65% by weight of the fiber will probably be used; or with a binder, 50% by weight fiber for a dry-laid substrate. Preferably, the fiber would be from about 65 to about 80% by weight. Wet laid substrates require less fiber and do not require a binder, although, as previously indicated, if using a wet laying procedure to prepare a phosphate reactive sheet with lower concentrations of fiber (less than 10% by weight), it will probably be desireable to use at least a small amount of binder. It is preferred to use from 0.5 to 11% by weight of binder with from about 5 to 14% by weight of fiber.

Although, it has been found that cellulose fibers and polyvinyl alcohol fibers will reduce or eliminate the need for a binder.

As little as 0.5% by weight of polyvinyl alcohol fibers are effective to give body to low fiber substrates. The use of polyvinyl alcohol fibers in an amount of from about 0.5 to about 5% by weight in a mixture with the other fibers is preferred therefore in lieu of a binder. For wet-laid substrates it is preferred to use from about 14 to about 70% by weight of fiber.

The reactants can be used in any respective ratio designed to produce a phosphate ceramic. Broadly, the metal (of the metal oxide) to phosphorous mole ratio in the overall system can be in the range of from about 0.75:1 to about 4:1. Preferably, it is from 1:1 to about 4:1. Preferably, the calcium to phosphorous mole ratio is set to form a neutral binder, which produces a hydrolytically stable ceramic. If, however, the particular article does not require hydrolytical stability in its intended use, or, if the particular matrix makes such stability less critical, less calcium could be used relative to the phosphate. The calcium:phosphorous ratio thus, broadly, could range from about 0.5:1 to about 4:1, and, preferably, from 0.75:1 to 2.5:1. If, however, hydrolytic stability is desired, the calcium:phosphorous ratio is preferably from about 1:1 to about 4:1, and, more preferably, from 1:1 to 2.5:1.

One preferred reaction system which could be used to prepare the instant materials sets the calcium silicate in the substrate at 100 parts by weight with the other reactants measured against the silicate as follows: from about 11 to about 65 parts by weight of the selected metal oxide; and an aqueous solution containing phosphoric acid. The phosphorous being present in an amount of from about 50 to about 200 parts by weight. This amount of phosphorous conveniently can be combined with the amount of water required to wet the wollastonite-containing homogeneous mixture.

Solution viscosity can vary considerably. Porosity and compressability of the substrate containing the calcium silicate and processing adaptations can be varied to accommodate solutions of different viscosities. When a more porous or compressable mixture has been prepared, a more viscous or concentrated solution can be used. Generally speaking, the solution should be fluid to penetrate the particular substrate composition. Processing adaptions which can also be implemented to help solution penetration would, for example, include varying: the amount of pressure and the manner of application of the solution to the substrate materials. One method of application is to wet the substrate with the solution while the subtrate mixture is in a loose form. Pressure must then be used to form the article. This method, however, is less preferred than forming an intact substrate which could preferably be immersed, painted, or sprayed with the solution. In such cases, the formation of the intact substrate, using methods such as wet laying or dry-laying, facilitates the application of the solution, and allows less solution to be used.

Different techniques can be used to provide a variety of different substrate forms which are applicable to a variety of different product uses. The phosphate reactive substrate can be prepared by mixing the ingredients. If desired, the ingredients for the substrate including the desired reactants can be mixed in an aqueous slurry and then dried in the desired substrate form. Preferred embodiments are also made using the wet laying and dry laying techniques of the paper, sheet, and board-making industry. In such embodiments, the matrix also acts to hold the substrate together, giving it good handling properties before the reaction. Products can be prepared as a brick, block, panel, board, or tile. Fibers can be included as non-woven masses in shreads or chopped.

Preferred phosphate reactive substrate forms are thus prepared using wet-laying and dry-laying techniques. These forms are especially advantageous since large amounts of fiber can be included for wetting with moderate amounts of solution.

The term "wet laying" is used herein to refer to the procedure which involves forming a slurry of the materials needed or desired for the reactive sheet (wollastonite, fiber, metal oxide, filler, binder, and pigment) flocculating the solids out of the slurry using the addition of a flocculant (also called a retention aid); and forming the sheet material using dewatering with an appropriate apparatus such as a Fourdrinier wire. This procedure is especially useful when a low fiber phosphate reactive sheet is desired.

Dry laying procedures are well known and used in the art for making ceiling and wallboards, cardboards, and other paper products. Such technology can be adapted to mixtures of fiber and calcium silicate with or without metal oxide, binder, and possibly a filler material, if desired. Suitable procedures and apparatus which might be adapted to prepare the instant phosphate reactive sheet materials can be found described in U.S. Pat. Nos. 2,581,069; 4,146,564; and 4,435,353.

Functionally, a binder can be considered to be part of the matrix, although even if a binder is used, an effective amount of fiber is needed. Fiber renders the substrate compressible and helps to keep the reacting composition together under pressure. The use of a binder as part of the matrix may be elected depending upon the substrate material desired in a particular instance. While the use of a binder does tend to make a complete wetting more difficult, the application of pressure in an effective amount during the reaction can be used to force the phosphoric acid solution into the substrate for a complete reaction. While any substance performing the function of a binder can be used, it is preferred to use water soluble or water permeable binders. If water insoluble binders are selected, they should preferably be limited to less than about 20% and more preferably, to less than 11% by weight of the total phosphate-reactive substrate composition. The more preferred amount is from 0.5 to about 11% by weight for such binders. A water soluble or solution permeable binder can be used in preferred amounts up to about 30% by weight, but preferably should be limited to an amount less than about 20% by weight of the total amount of the phosphate reactive substrate composition. A preferred concentration range being in an amount of from 0.5 to about 20% by weight.

The amount of phosphorous in the solution can be set at a desired concentration, selected to make either a neutral or acidic ceramic depending upon the amount of calcium in the substrate. Usually, a neutral ceramic will be desired, especially if a water-resistant product is necessary. A wide concentration range is permitted. The phosphoric acid solution used should be at least 25% by weight in phosphorous pentoxide; and preferably, is at least 35% by weight phosphorous pentoxide. A preferred concentration range for the phosphorous pentoxide in the solution is from about 35 to about 75% by weight phosphorous pentoxide.

When the instant phosphate-reactive compositions are wetted with the phosphoric acid solution, an effective amount of pressure will be used to drive the solution into the substrate for a complete wetting and a complete reaction; the pressure also makes the reacting mixture more dense, and acts to provide a much stronger product.

The specific amount of pressure used in a particular instant will depend upon factors relating to the type of substrate composition and its intended use. Lower pressures down to 20 psi can be used with certain substrates or to merely mold or emboss. Higher pressure will be used if a stronger product is needed. A minimum pressure level is usually about 50 psi (pounds per square inch). Such low pressure levels will, for example, be suitable for applications involving more compressable substrates.

Generally, however, high pressures, in excess of about 100 psi, will be used. A suitable range is from about 100 to about 1,500 psi. When even stronger phosphate ceramic products are needed, even higher pressures are used during the reaction. Such pressures are acceptably in excess of about 250 psi; preferably, in excess of about 500 psi; and most preferably, in excess of 950 psi. As a general rule, the higher the pressure is during the reaction, the stronger the product will be. A preferred pressure range is from about 500 to about 1,500 psi.

The presence of metal oxide is required in the reaction system for the phosphate ceramic. Permissively, the instant invention allows the metal oxide to be placed (A) in the solution of phosphoric acid, (B) intermixed with the wollastonite in the substrate composition, or (C) in both.

For embodiments under (A) where all of the metal oxide is in the solution, the entire amount of metal oxide used is reacted with the phosphate before contacting the phosphate-reactive substrate.

In such a case, the solution will contain the dissolved metal-phosphate salt complex from the reaction between the metal oxide and the phosphoric acid. Since these solutions are more viscous, they will usually require one or more of the following: more water in the solution, higher pressures during the reaction, a more porous substrate, and a thin substrate. For such applications, the phosphorous to metal mole ratio most preferably will be in the range of from about 5:1 to about 2:1.

For the embodiments under (B), the substrate composition containing the wollastonite will also contain the entire amount of metal oxide. In this case, the complete reaction occurs when the phosphorous acid is applied. Since the reaction is exothermic, it may be desired in this embodiment, to lower the reaction temperature. Further, under (B) less visous reaction solutions can be prepared, making it easier to wet the entire substrate.

For the embodiment under (C), the metal oxide can be separated into two portins, one of which is combined homogeneously with the wollastonite and the other portion is mixed with the phosphoric acid solution. In this embodiment by varying the size of the portion of the metal oxide in the phosphoric acid solution, the time it takes for rigidity to occur can be varied. Frequently, rigidity is desired as quickly as possible since this will decrease the length of time that pressure must be applied.

If rigidity is desired quickly, (A) above can be used, or under (C) the amount of metal oxide placed in the solution can be increased. Heating during the reaction also helps rigidity to take place. Suitably, the temperature can be maintained in the range of from about 60° to about 120° C. will also tend to encourage a rapid setting. Thus, it might be desired to increase the temperature during the reaction to help the ceramic to become rigid more rapidly, if only a small portion of metal oxide is put in the solution.

Acceptably, for the embodiment under (C) from about 1 to about 80% by weight of the total metal oxide present in the reacting system can be placed in the solution; while from about 99 to about 20% by weight of the metal oxide used is in the substrate. In more preferred embodiments under (C), a selected amount in the range of from about 11 to about 65 parts by weight of metal oxide are used based upon 100 parts by weight of calcium silicate; from about 1 to about 80% by weight of this selected amount is placed in the solution while from about 99 to about 20% by weight of the metal oxide is in the substrate.

In other preferred embodiments, some wollastonite is included in the phosphoric acid solution in addition to being present in the substrate. Including a portion of calcium silicate in the phosphoric acid solution causes a coating to form on the substrate surface. This coating is predominantly from the calcium silicate. Advantageously, this results in a surface which is both non-acidic, and smoother. This type of surface is also useful when embossing designs onto the surface. Preferably, embossing is done when pressure is applied to the substrate.

The calcium silicate added to the solution is in addition to the calcium silicate which must be present in the substrate. Using this embodiment, the resulting ceramic product can be given a smoother, textured, or embossed calcium-ceramic coating. While the amount of calcium desired will largely depend on the size of the surface area that needs the coating, the solution should not contain more than 35% by weight calcium silicate. Acceptably, the solution can be from about 5 to about 35% by weight wollastonite; preferably, it is from about 10 to about 25% wollastonite.

By using a descriminatory selection of fiber, filler, pigments, and even binder, variations in textural and other visual characteristics can be achieved. Fiber, filler, and pigments can even be selected and arranged so that attractive patterns or designs are provided. Pressure can be used along with apparatus effective to mold or emboss the article.

The fiber used with the instant process and compositions can be natural, synthetic, or both. Natural fibers should be understood to be a fiber made out of any naturally available material, including materials selected form the group consisting of: minerals, metals, and cellulosic materials. Cellulosic fibers and polyvinyl alcohol fibers are included in some of the preferred embodiments of the instant invention. Synthetic fibers can also be used with some of the preferred embodiments of the instant invention. A variety of polymers can be used to provide such synthetic fibers. Fibers used with the instant invention can thus also be made of material selected from the group consisting of: polyethylene, polyvinyl alcohol, polypropylene, carboxylated acrylo-nitrile butadiene, polyvinylidene chloride, polystyrene, polystyrene butadiene, polyvinyl chloride, polyamid, polybenzimidazole, polyester, polyacrylate, and polyarimide. Preferred fibers can be selected from the group consisting of polybenzimidazole, polyacrylate, polyester, polyarimide, polyvinyl alcohol, cellulose, glass, carbon, and ceramic wool.

The fiber selected for specific embodiments of the instant invention will depend upon the characteristics and properties desired for the final product. For example, if flame, heat and smoke resistance is a factor, polybenzimadazole fibers would be preferred.

A filler material selected or desired in a particular instance will depend upon the application and characteristics desired in the final product. Ceiling and wall panels, for example, frequently include fillers and pigments which give a decorative effect. The filler material can be either natural or synthetic. Some suitable naturally found materials which could be adapted as filler material for the instant invention include: minerals and celulosic materials. Preferred fillers include: glass, talc, metallic chips, metallic powder, perlite, and glitter. Synthetic polymers are also good fillers. Fillers are generally used in an amount less than about 40% by weight of the substrate. A preferred concentration range is from about 5 to about 35% by weight.

In preferred embodiments, microspheres containing phosphoric acid are included in the substrate composition. Procedures for the preparation of microspheres are known in the art, and can be applied to encapsulate in a sphere portions of the aqueous solution of the phosphoric acid or the phosphoric acid and metal oxide. Such microcapsules can be ruptured in the substrate by the application of either pressure or heat. Preferably, the microcapsule shell melts with heat, and pressure is used both to compact the substrate and to disperse the solution in the substrate. All or part of the required solution can be applied in this manner.

When heat is used to release the solution, the shell of the microcapsule will be made of an organic polymer which softens and melts within a desired temperature range. Such organic polymers, for example, are polyolefins, polyvinyl chloride, polyvinylidene chloride, polyacrylate, and polystyrene.

The instant invention can also be readily understood from the examples that follow. It should be understood, however, that these examples are offered to illustrate the instant invention and thus, they should not be taken to limit it. All parts and percentages are by weight unless otherwise indicated.

EXAMPLE 1

A slurry of the following composition is prepared in a Waring blender:
13.18 parts refined wood pulp
8.49 parts ceramic wool
71.2 parts wollastonite
7.12 parts magnesium oxide
3932 parts water.

After blending for 30 seconds (sec.), the slurry is poured into a container and diluted with water to 1.3% solids. While stirring slowly, 0.02 grams of Percol (224), an anionic flocculant (also called a retention aid) was added. The slurry was then poured into a Williams sheet mold and drained. The paper that formed on the screen, in the bottom of the mold, was removed, pressed at 4–5 lbs./sq. inch to remove excess water, and dried using a hot water heated, drum drier.

This sheet was then saturated using a slurry of the following: 14.0 parts of a finely divided wollastonite, 1.4 parts of magnesium oxide (dead burn), and 100 parts of an aluminum phosphate solution containing 100 parts of 85% phosphoric acid and 20 parts aluminum hydroxide and 25 parts water. Five minutes was allowed for the slurry to saturate the paper and then the sheet was pressed in a flat press at a pressure of 1,000 psi (pounds per square inch); and heated to 180° F. A piece of Teflon cloth was placed between the press plates and the saturated paper to prevent sticking. The sample was allowed to cure for 3 minutes in the press, and was removed and placed in an oven at 200° F. for 60 minutes. The resulting sheet had the following properties:
Sheet Density=121.5 lbs/ft3
Flexural Strength=7974 psi (pounds per square inch).

EXAMPLE 2

A series of different pressures were applied to saturated papers having the identical composition and made using the identical procedure as described in Example 1. The same equipment and saturation procedure was used. The 180° curing temperature was used while pressure was applied for 3 minutes until the setting reaction caused the sample to become rigid. The samples were then baked in an oven at 200° F. to evaporate water from the rigid sample. The following results were obtained:

TABLE 1

| Pressure | Sheet Thickness of Finished Sheet | Sheet Density of Finished Sheet | Flexural Strength |
|---|---|---|---|
| Atmospheric | .075 in | 83.5 lb/ft3 | 2653 psi |
| 139 psig | 0.58 in | 106.9 lb/ft3 | 6184 psi |
| 417 psig | .052 in | 111.8 lb/ft3 | 6668 psi |
| 694 psig | .047 in | 115.7 lb/ft3 | 6894 psi |

Pounds Per Square Inch (psi)
Pounds Per Cubic Foot (lb/ft3)

From the data of Table 1, it can be noted that the psi flexural strength of the finished product increased over 130% with the application of only 139 psig of pressure to the saturated paper being cured; the increase in density was 30%.

EXAMPLE 3

This Example demonstrates that several substrates can be pressed together to form high strength articles.

Using the procedure described in Example 1, four 12"×12" sheets of the following composition were made in a wet-lay handsheet mold:
8.9 parts by weight cellulose fiber
8.9 parts glass fiber
74.7 parts calcium silicate
7.47 parts magnesium oxide.

The sheets were then saturated using a slurry of the following: 14.0 parts of a finely divided wollastonite, 1.4 parts of magnesium oxide (dead burn), and 100 parts of an aluminum phosphate solution containing 100 parts of 85% phosphoric acid and 20 parts aluminum hydroxide and 25 parts water.

The sheets were then pressed at 1000 psig and 180° F. for two minutes. The resulting multi-layered composite was then removed and dried at 200° F. for another 30 minutes. Sample thickness was measured at 95 mils. The sample was tested and the following data collected:

| Bending Strength | Strength Retained After Soaking in $H_2$ for 24 Hrs. |
|---|---|
| Flexural Strength ASTM D-1037 7,000 psi | 75% |

EXAMPLE 4

A slurry of the following composition was prepared in a Waring blender:
13.17 parts refined wood pulp
8.48 parts glass wool
71.2 parts wollastonite
7.13 parts magnesium oxide
3932 parts water.

After blending for 30 seconds (sec.), the slurry was poured into a container and diluted with water to 1.3% solids. Thereafter, while stirring slowly, 0.01 parts by weight of an anionic flocculant (Retention Aid-Percol (224) was added. The slurry was then poured into a Williams sheet mold and drained. The paper that formed on the screen in the bottom of the mold was removed, pressed at 4—5 lbs./sq. inch to remove excess water, and dried using a hot water heated, drum drier.

This sheet was then saturated with the following slurry: 14.0 parts of a finely divided wollastonite, 1.4 parts of magnesium oxide (dead burn), and 100 parts of an aluminum phosphate solution containing 100 parts of 85% phosphoric and 20 parts aluminum hydroxide and 25 parts water. Five minutes was allowed for the slurry to saturate the paper and then the sheet was pressed in a flat press at a pressure of 1,000 psi, and at a temperature of 180° F. A piece of Teflon cloth was placed between the press plates and the saturated paper to prevent sticking. The sample was allowed to cure for 3 minutes in the press until it was rigid. Then it was removed and placed in an oven at 200° F. for 60 minutes. The resulting sheet was tested and the following data was collected.
(A) Sheet Density=ASTM D-1505-68 120.39 Kg/m3 (Kilogram/meter3)
(B) Flexural Strength ASTM: D-1037 6973 psi
(C) Flexural Modulus ASTM: D-1037 1949 kilograms per square inch (D) Tensile Strength (MEP 36R.1) Yield: 1634 psi dry–1049 psi wet Ultimate: 2050 psi dry–1539 psi wet
(E) Tensile Modulus MEP 36R.1 1569 ksi dry - 1544 ksi wet
(F) Compressive Strength (ASTM D-695) 18,333 psi
(G) Impact Strength (ASTM D256-81) (1) Unnotched: 38.7 inch-lb/sq. in. (2) Notched: 22.4 inch-lb/sq. in.
(H) Tensile Strength (Perpendicular) (ASTM C-209) Load - Pull 120 psi

EXAMPLE 5

Using the procedures and slurry as described in Example 4, separate ceramic-fiber sheets were prepared. The ingredients and amounts are listed below (not including the 0.01 parts of the flocculant-Percol 224) along with test results for the sheet produced.

Sample A Composition 6.58 parts refined wood pulp
8.49 parts glass wool
6.58 parts fibrillated polypropylene fiber
71.2 parts wollastonite
7.13 parts magnesium oxide

Test Results (A) Sheet Density=ASTM D-1505-68 113.4 Kg/m3 (Kilogram/meter3)
(B) Flexural Strength ASTM: D-1037 5860 psi
(C) Flexural Modulus ASTM: D-1037 1732 kilograms per square inch (ksi)
(D) Tensile Strength (MEP 36R.1) Yield: 1547 psi dry - 957 psi wet Ultimate: 2330 psi dry - 1299 psi wet
(E) Tensile Modulus MEP 36R.1 1580 ksi dry - 1402 ksi wet
(F) Compressive Strength (ASTM D-695) 12750 psi
(G) Impact Strength (ASTM D256-81)
  (1) Unnotched: 25.76 inch-lb./sq. in.
  (2) Notched: 17.26 inch-lb./sq. in.
(H) Tensile Strength (Perpendicular) (ASTM C-209) Load - Pull 140 psi

Sample B Composition 13.76 parts refined wood pulp
4.43 parts carbon wool
74.36 parts wollastonite
7.44 parts magnesium oxide

Test Results (A) Sheet Density=ASTM D-1505-68 114.79 Kg/m3 (Kilogram/meter3)
(B) Flexural Strength ASTM: D-1037 9370 psi
(C) Flexural Modulus ASTM: D-1037 2320 ksi
(D) Tensile Strength (MEP 36R.1) Yield: 1758 psi dry Ultimate: 3420 psi dry - 1817 psi wet
(E) Tensile Modulus MEP 36R.1 1726 ksi dry - 1307 ksi wet
(F) Compressive Strength (ASTM D-695) 20,917 psi
(G) Impact Strength (ASTM D256-81)
  (1) Unnotched: 52.78 inch-lb/sq. in.
  (2) Notched: 28.52 inch-lb/sq. in.

Sample C Composition 13.17 parts refined wood pulp
8.48 parts ceramic wool fiber
71.2 parts wollastonite
7.13 parts magnesium oxide

Test Results (A) Sheet Density=ASTM D-1505-68 121.42 Kg/m3 (Kilogram/meter3)
(B) Flexural Strength ASTM: D-1037 8540 psi
(C) Flexural Modulus ASTM: D-1037 2290 ksi
(D) Tensile Strength (MEP 36R.1) Yield: 2400 psi dry - 1626 psi wet Ultimate: 2820 psi dry - 2130 psi wet
(E) Tensile Modulus MEP 36R.1 1976 ksi dry - 839 ksi wet
(F) Compressive Strength (ASTM D-695) 28,700 psi
(G) Impact Strength (ASTM D256-81)
  (1) Unnotched: 34.88 inch-lb/sq. in.
  (2) Notched: 17.89 inch-lb/sq. in.

Sample D Composition 6.59 parts refined wood pulp
8.48 parts ceramic wool fiber
6.58 parts polyvinyl alcohol fibers (Kuralon 103)
71.2 parts wollastonite
7.13 parts magnesium oxide The polyvinyl alcohol fibers (Kuralon 103 by KURARAY) are 70% solid and are non-soluable.

Test Results (A) Sheet Density=ASTM D-1505-68 116.69 Kg/m3 (Kilogram/meter3)
(B) Flexural Strength ASTM: D-1037 5860 psi
(C) Flexural Modulus ASTM: D-1037 1019 ksi
(D) Tensile Strength (MEP 36R.1) Ultimate: 2720 psi dry - 1479 psi wet
(E) Compressive Strength (ASTM D-695) 35,167 psi
(F) Impact Strength (ASTM D256-81)
  (1) Unnotched: 54.53 inch-lb/sq. in.
  (2) Notched: 33.19 inch-lb/sq. in.
(G) Tensile Strength (Perpendicular) (ASTM C-209) Load - Pull 133 psi

Sample E Composition 6.72 parts polyvinyl alcohol (KURALON 103)
0.5 parts polyvinyl alcohol (KURALON 105)
7.22 parts glass wool
7.22 parts fibrillated polypropylene
71.2 parts wollastonite
7.13 parts magnesium oxide Kuralon 105 by Kuralay is a 96% solid fiber that is soluable in water that is over 30° C. This experiment was done in water at room temperature (about 25° C).

(A) Sheet Density=ASTM D-1505-68 108.55 Kg/m3 (Kilogram/meter3)
(B) Flexural Strength ASTM: D-1037 7760 psi
(C) Flexural Modulus ASTM: D-1037 1457 ksi
(D) Tensile Strength (MEP 36R.1) Ultimate: 1920 psi dry - 1386 psi wet
(E) Compressive Strength (ASTM D-695) 21,040 psi
(F) Impact Strength (ASTM D256-81)
  (1) Unnotched: 54.74 inch-lb/sq. in.
  (2) Notched: 24.48 inch-lb/sq. in.
(G) Tensile Strength (Perpendicular) (ASTM C-209) Load - Pull 128.33 psi

EXAMPLE 6

This Example is offered to show the slight variations in some physical characteristics which can be obtained using different types of paper-making apparatus. Comparison can be made to Example 4 which shows the same composition, but the use of the Williams sheet mold.

The wet-laid phosphate reactive substrate composition having the identical ingredients in the identical proportions as appears in Example 4 were prepared on a Pilot plant scale. The apparatus used included a pulper batch container, a precipitation tank, and a Fourdrinier wire for wet-laying. A drum dryer was also used at a temperature of 220° F.

An aqueous slurry of the cellulose fibers was prepared in the first pulper batch, an aqueous slurry of the glass wool fibers was prepared in the second pulper batch, and an aqueous slurry of the wollastonite and magnesium oxide was prepared in the third pulper batch. The aqueous pulper batch slurries were then pumped to the precipitation tank and water was added to bring the slurry to 1.33% solids. Nine hundred gallons of water was present in the tank. The flocculant (Percol 224) was added at a speed of 240 cc/minute while agitation continued. The sheet was wet-laid using a Fourdrinier wire at a line speed of three feet per minute. The sheet was then dried at 220° F.

A slurry having the same makeup as is described in Example 4 was used to saturate a sample of this Fourdrinier wire prepared material. After saturation, the procedure described in Example 4 was also used to prepare the phosphate ceramic fiber product. The test results and the substrate composition ingredients are given below.

Composition 13.17 parts refined wood pulp
8.48 parts glass wool
71.2 parts wollastonite
7.13 parts magnesium oxide Test Results (A) Sheet Density=ASTM D-1505-68 121.01 Kg/m3 (Kilogram/meter3)
(B) Flexural Strength ASTM: D-1037 6410 psi
(C) Flexural Modulus ASTM: D-1037 1881 ksi
(D) Tensile Strength (MEP 36R.1) Yield: 2163 psi dry - 1050 psi wet Ultimate: 2957 psi dry - 1520 psi wet
(E) Tensile Modulus MEP 36R.1 1552 psi dry - 1332 psi wet
(F) Compressive Strength (ASTM D-695) 14,375 psi
(G) Impact Strength (ASTM D256-81)
  (1) Unnotched: Machine Direction 36 inch-lb/sq. in Against Machine Direction 27.5 inch-lb/sq. in.
  (2) Notched: Machine Direction 23.5 inch-lb/sq. in. Against Machine Direction 18.96 inch-lb/sq. in.
(H) Tensile Strength (Perpendicular) (ASTM C-209) Load-Pull 80 psi

EXAMPLE 7

This example is included to show that the phosphate reactive substrate materials prepared as rigid building panels which are embossed to have a design. A slurry of the following composition was prepared:
180 grams wood pulp
45 grams newsprint pulp
4.5 grams ¼" glass fibers
90 grams (Nyad 400) Wollastonite
18 grams MgO
112.5 grams perlite Using procedures generally described in Example 1, a base sheet was wet-laid. The sheet was then dried, but not pressed. The dried sheet was then saturated with a solution containing the following:

141.4 grams 85% $H_3PO_4$
28.3 grams Alumina Trihydrate
103.3 grams $H_2O$

After saturation, the sample was pressed and cured to form a rigid, embossed sheet.

What is claimed is:

1. A composition comprising a phosphate ceramic structure made by (A) contacting a compressible phosphatereactive substrate with an aqueous phosphoric acid solution, and (B) applying pressure to compact the compressible phosphate reactive substrate while a chemical reaction takes place in the substate to form the phosphate ceramic structure, further providing that the said compressible phosphate reactive substrate comprises: calcium silicate; a metal oxide selected from the group consisting of: calcium oxide, aluminum oxide, zinc oxide, and magnesium oxide; and a nonreactive matrix of (1) fiber or (2) fiber and a binder wherein the fiber is present in an amount effective to make the substrate compressible.

2. A composition as described in claim 1 wherein the compressible, phosphate reactive substrate is further characterized in that it is an intact substrate.

3. A composition as described in claim 1 wherein the pressure used is in the range of from about 500 to about 1,500 pounds per square inch.

4. A composition as described in claim 1 wherein the matrix is fiber, further providing that the fiber contains polyvinylalcohol fibers in the substrate in an amount of from about 0.5 to about 5% by weight.

5. A composition as described in claim 1 wherein the aqueous phosphoric solution also contains a metal oxide selected from the group consisting of: calcium oxide, aluminum oxide, magnesium oxide, and zinc oxide.

6. A composition as described in claim 1 wherein the fiber is selected from the group consisting of: glass, ceramic wool, cellulose, polyvinyl alcohol, polyaramid, and polybenzimidazole.

7. A composition as described in claim 1 wherein the fiber is present in an amount of from about 14 to about 70% by weight and wherein the substrate is further characterized in that it was formed by wet-laying.

8. A composition as described in claim 1 wherein the pressure applied was in excess of about 100 pounds per square inch.

9. A composition as described in claim 1 wherein the aqueous phosphoric acid solution also contains calcium silicate in an amount less than 35% by weight of the solution, whereby the phosphate ceramic structure was formed with a coating.

10. A composition as described in claim 9 wherein the aqueous phosphoric acid solution also contains a metal oxide selected from the group consisting of: calcium oxide, aluminum oxide, magnesium oxide, and zinc oxide.

11. A composition comprising a phosphate ceramic structure made by (A) contacting a compressible phosphatereactive substrate with an aqueous mixture of a solution of phosphoric acid and a metal oxide selected from the group consisting of: calcium oxide, aluminum oxide, zinc oxide, and magnesium oxide, and then applying pressure to compact the compressible phosphate reactive substrate while a chemical reaction takes place in the substrate to form the phosphate ceramic structure, further providing that the said compressible phosphate-reactive substrate comprises calcium silicate; and a non-reactive matrix of (1) fiber or (2) fiber and a binder, wherein the fiber is present in an amount effective to make the substrate compressible.

12. A composition useful for the preparation of a phosphate ceramic structure comprising: a compressible phosphate-reactive substrate which includes: a mixture of calcium silicate; a metal oxide selected from the group consisting of: calcium oxide, magnesium oxide, zinc oxide, and aluminum oxide; microcapsules containing an aqueous solution with phosphoric acid; and a non-reactive matrix of (a) fiber or (b) fiber and a binder.

13. A composition as described in claim 12 wherein the fiber is present in an amount greater than about 4% by weight.

14. A composition as described in claim 12 wherein the substrate further contains a pigment and a filler.

15. A process for producing a strong, durable phosphate ceramic structure comprising (A) contacting a compressable phosphate-reactive substrate composition with an aqueous phosphoric acid solution; and (B) applying pressure to the phosphate reactive substrate in an amount effective to compact the substrate while a chemical reaction takes place in the substrate to form a phosphate ceramic structure, further providing that the said phosphate reactive substrate composition comprises calcium silicate; a metal oxide selected from the group consisting of: calcium oxide, aluminum oxide, zinc oxide and magnesium oxide; and a non-reactive matrix of fiber or fiber and a binder, wherein the fiber is present in an amount effective to make the substrate compressible.

16. A process as described in claim 15 wherein a metal oxide selected from the group consisting of: calcium oxide, aluminum oxide, magnesium oxide, and zinc oxide is mixed with the aqueous phosphoric acid solution before it contacts the compressible phosphate reactive substrate, further providing that the metal oxide in the solutin and the metal oxide in the compressible substrate together provide a total amount of metal oxide of from about 11 to about 65 parts by weight of metal oxide based upon 100 parts by weight of the calcium silicate in the substrate, wherein further, the solution contains from about 1 to about 80% by weight of the total amount of metal oxide, and wherein the substrate contains from about 99 to about 20% by weight of the total amount of metal oxide.

17. A process as described in claim 16 wherein the pressure used is in excess of about 100 pounds per square inch.

18. A process as described in claim 16 wherein the matrix consists of the fiber in an amount of from about 14 to about 70% by weight.

19. A process as described in claim 15 wherein the calcium silicate is present in the compressible phosphate reactive substrate in an amount of from about 15 to about 85% by weight.

20. A process as described in claim 15 wherein the matrix is fiber, further providing that the fiber contains polyvinylalcohol fibers in the substrate in an amount of from about 0.5 to about 5% by weight.

21. The process of claim 15 wherein the compressible phosphate reactive substrate is an intact substrate.

22. The process of claim 21 wherein the aqueous phosphoric acid solution also contains calcium silicate in an amount less than 35% by weight of the solution, whereby the phosphate ceramic structure formed has a coating.

23. A process as described in claim 15 wherein the fibers are cellulosic fibers.

24. A process as described in claim 15 wherein the matrix consists of the fiber in an amount of from about 4 to about 90% by weight of the substrate.

25. A process as described in claim 15 wherein the substrate has been formed by wet-laying.

26. A process as described in claim 4 wherein the matrix consists of the fiber in an amount of from about 14 to about 70% by weight.

27. A process as described in claim 1 wherein the ceramic structure formed is a brick, a block, a panel, a board, or a tile.

28. A process as described in claim 21 wherein the pressure used is in excess of about 100 pounds per square inch.

29. A process for producing a strong, durable phosphate ceramic structure comprising (A) contacting a compressible phosphate-reactive substrate composition with an aqueous mixture of phosphoric acid and a metal oxide selected from the group consisting of: calcium oxide, aluminum oxide, zinc oxide, and magnesium oxide and (B) applying pressure to the compressible phosphate-reactive substrate in an amount effective to compact the substrate while a chemical reaction takes place in the substrate to form a phosphate ceramic structure; further providing, that the said compressible phosphate-reactive substrate composition comprises calcium silicate and a matrix of (1) fiber or (2) fiber and a binder wherein the fiber is present in an amount effective to make the substrate compressible.

30. A process as described in claim 1 wherein the matrix consists of fiber in an amount of from about 14 to about 70% by weight.

31. A process as described in claim 6 wherein the ceramic structure formed is a brick, a block, a panel, a board, or a tile.

32. A process as described in claim 8 wherein the substrate has been formed by dry-laying.

33. A process as described in claim 29 wherein the pressure used is in excess of about 100 pounds per square inch.

* * * * *

UNITED STATES PATENT AND TRADEMARK OFFICE
CERTIFICATE OF CORRECTION

PATENT NO. : 4,792,359
DATED : December 20, 1988
INVENTOR(S) : Jeffery L. Barrall et al It is certified that error appears in the above-identified patent and that said Letters Patent is hereby corrected as shown below:

Column 7, line 19, "portins" should read --portions--.

Column 10, line 26, "$H_2$" should read --$H_2O$--.

Column 11, line 55, -- - 866 psi-- should be inserted after the word "dry".

In the claims, claim 26 at column 16, "claim 4" should read --claim 25--.

In the claims, claim 27 at column 16, "claim 1" should read --claim 15--.

In the claims, claim 28 at column 16, "claim 21" should read --claim 15--.

In the claims, claim 30 at column 16, "claim 1" should read --claim 29--.

In the claims, claim 31 at column 16, "claim 6" should read --claim 29--.

In the claims, claim 32 at column 16, "claim 8" should read --claim 29--.

Signed and Sealed this

Thirtieth Day of May, 1989

Attest:

DONALD J. QUIGG

Attesting Officer

Commissioner of Patents and Trademarks